July 7, 1931. W. R. LAWSON 1,813,244
OIL GAUGE
Filed July 10, 1928
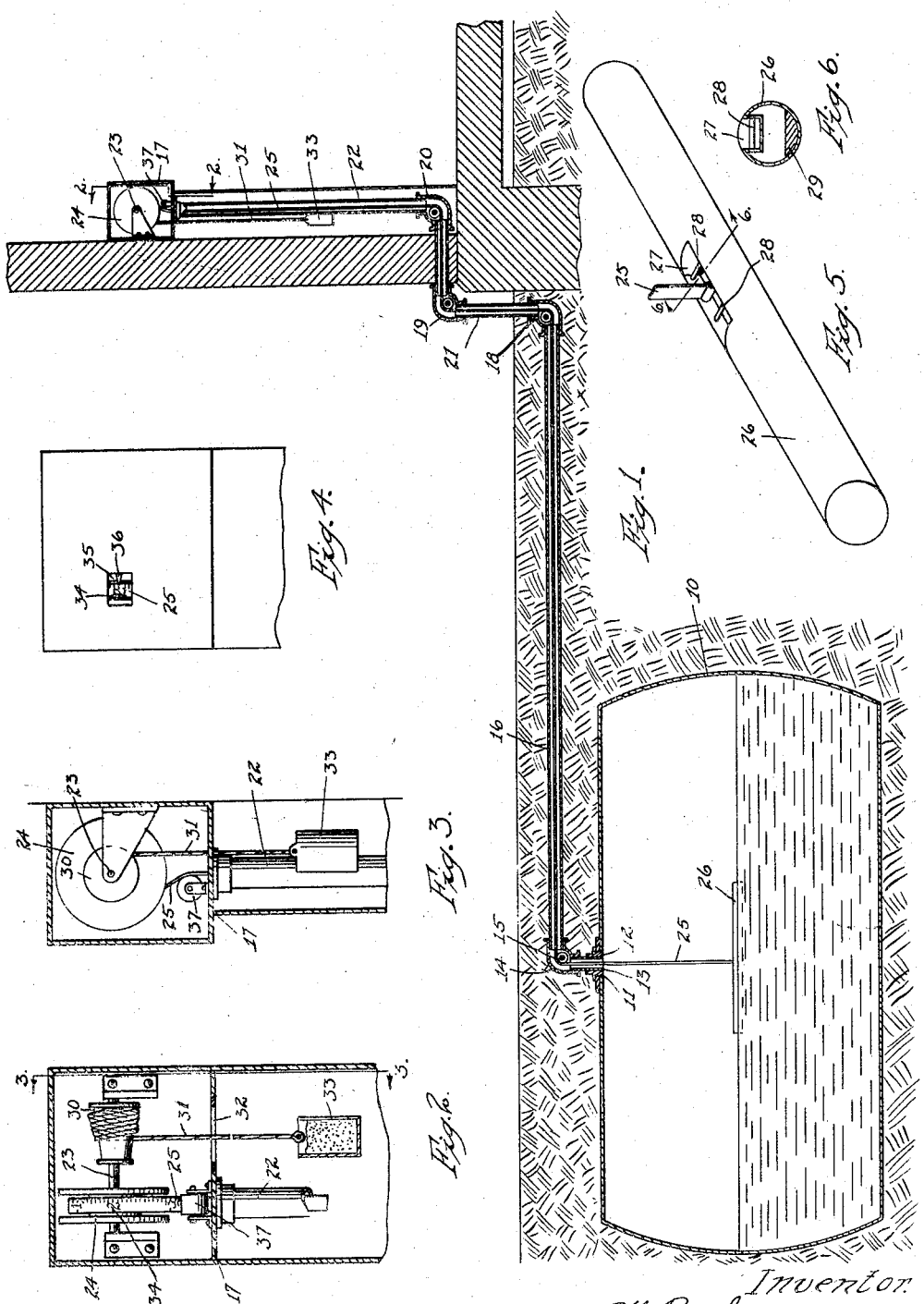

Patented July 7, 1931

1,813,244

UNITED STATES PATENT OFFICE

WALTER R. LAWSON, OF CLARINDA, IOWA

OIL GAUGE

Application filed July 10, 1928. Serial No. 291,612.

This invention relates to improvements in oil gauges of that type designed to register the elevation of the oil or other liquid in tanks or suitable containers supported a considerable distance from, or above or at one side of, the gauge, and of that type employing a graduated tape to be wound on a drum in a spiral manner.

Devices of this type are usually provided with a float in the container, to which one end of the tape is connected, and with yieldable means, such as a weight or spring, for winding the tape on the drum to take up or give out the tape as the float is elevated and lowered. If a spring is used for winding the drum, then the tension of the spring increases as the drum is unwound. This in turn causes the float to be pulled out of the liquid so that the weight of the float may be made to counteract the increased tension of the spring. This results in an inaccurate reading due to the variation in the buoyancy line of the float.

If a weight is used, then the winding and unwinding of the tape has the same effect as increasing or decreasing the dimensions of the drum on which the tape is wound, which in turn varies the leverage between the tape and the counterbalancing weight, which also results in an inaccurate reading.

Another difficulty with this type of gauges lies in the fact that often the tanks or containers, in which the gauge is mounted, are provided with very small openings, and for that reason it is difficult to insert a large enough float to actuate the gauge mechanism, and to overcome the friction of the apparatus, without causing too great variation in the depth of the float in the liquid as the float is moved to various elevated positions in the container.

It is, therefore, the object of my invention to provide a gauge of the type above described, whereby the above objections are overcome.

A further object is to provide in a liquid gauge of the type employing a float an improved float which may be easily and quickly applied to containers having comparatively small openings, whereby a comparatively large float may be inserted through a comparatively small opening.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a sectional view illustrating the manner in which my improved gauge is applied to an oil tank buried in the ground, and the manner in which the float is connected with said gauge, the casing of the gauge being in section, and the gauge illustrated in end elevation.

Figure 2 is a detail sectional view taken on the line 2—2 of Figure 1.

Figure 3 is a detail sectional view taken on the line 3—3 of Figure 2.

Figure 4 is a front elevation of the upper end of the gauge casing.

Figure 5 is a perspective view of the float controlling and operating gauge.

Figure 6 is a detail sectional view taken on the line 6—6 of Figure 5.

The numeral 10 indicates an oil or gasoline tank buried under the ground surface, and provided with an opening 11 in its top side, in which is supported a plug 12 having an upwardly projecting pipe 13 for communicating with the interior of the tank 10. The upper end of the pipe 13 is provided with an elbow 14 in which is mounted a roller 15.

Connected to the elbow 14 is a horizontally arranged pipe 16 connected with the gauge casing 17. Said pipe 16 includes elbows 18, 19 and 20 and short pipe sections 21 and 22, each of said elbows having a roller similar to the roller 15 of the elbow 14.

The casing 17 is provided with a horizontally arranged shaft 23 rotatively mounted therein. One end of said shaft 23 is provided with a drum 24 on which is wound a steel tape 25 in a spiral manner. One end of said tape 25 is designed to project downwardly into the pipe 22 and through the pipe 16, and finally terminating with its lower end in the tank 10, said tape extending under the rollers 15 in the manner clearly illustrated in Figure 3.

The lower end of said tape 25 is secured to a float 26, preferably of cylindrical formation and of comparatively small diameter, so that said float may be placed through the opening 11 after the block 12 has been removed.

The central portion of the float 26 is provided with a cavity 27 in which is mounted transversely arranged pins 28. The center one of the pins 28 is pivotally secured to the lower end of the tape 25 before the float is placed in position within the tank. This may be accomplished by placing the float vertically above the open end of the opening 11 with the tape 25 adjacent to one side of said float, then inserting the float endways into said tank, which will automatically assume an upright position as indicated in Figure 1, on account of the float 26 being of hollow formation. The lower side of the float is provided with a weight 29 which causes the float to assume and maintain an upright position after being placed in the tank.

The outside pins 28 are provided to assist in removing the float if so desired, which may be accomplished by inserting in the opening 11 a rod with a hook on one end and grasping one of the pins 28 which is mounted off center, in such a manner that any upward movement of the rod will cause the float to assume a nearly upright vertical position.

For taking up the slack in the tape 25 as the float 26 is elevated in the tank 10, I have provided on the shaft 23 a conical drum 30 on which is wound a cable 31 having one end projecting downwardly through an opening 32 in the bottom of the casing 17. The lower end of said cable is provided with a container 33 for receiving ballast, such as sand or the like. The cable 31 is wound on the drum 30 in the opposite direction from which the tape is wound on the drum 24, in such a manner that the weight of the container 33 will counterbalance the weight of the float 26 and keep the tape 25 in a taut condition.

The cable is wound on the drum 30 in such a manner that when the float 26 is lowered and the drum 24 is unwound, the cable 31 will travel from the larger end of the drum 30 to its smaller end, thereby decreasing the active diameter of said drum 30 in the same proportion as the active diameter of the drum 24 is decreased, so that the same leverage ratio is always maintained between the cable 31 and the tape 25, regardless of the elevated position of the float 26.

The tape of the drum 30 may be slightly lessened so that the difference in the weight of the tap 25 may also be compensated for, as it will readily be seen that when the weight 26 is at its lower limit of movement, the tape 25 is heavier than when the float is at its upper limit of movement.

The outer face of the tape 25 is provided with graduations 34 which are equally spaced apart, said graduations being preferably spaced apart one foot to indicate the number of feet of liquid within the tank 10.

An opening 35 is provided in the front of the casing 17, said front being provided with a pointer 36. The said opening and pointer are so located as to rest directly in front of the tape 25, to thereby provide means for designating the elevation of liquid within the tank. The numeral 2 is opposite the said opening as indicating that there are two feet of liquid in the tank 10. These graduations may then be subdivided if so desired into inches or fractions thereof, or if so desired, the tape may be so graduated as to read in gallons or barrels, in which case the spacings would not be equal.

A roller 37 is provided in the casing 17 to serve as a guide for the tape 25 to direct it into the upper end of the pipe 22.

By this arrangement it will be seen that I have provided a liquid gauge which is particularly adapted to be used in connection with gasoline tanks and the like of that type which are buried in the ground a considerable distance from the filling station, and in which is provided means whereby the operator in the filling station may at all times accurately ascertain the amount of liquid within the tank, and in which the reading of the gauge will not be materially effected, whether the tank is full or empty, as the counterweight 33 always very accurately balances the weight of that portion of the unwound tape 25.

In this connection it should be noted that the container 33 should be filled with ballast, such as sand, until the friction of the tape 25 and the pulleys 15 are overcome, so that when the float 26 moves upwardly, the weight 33 will be lowered, and the slack in the tape taken up in the manner above described.

If the liquid level within the tank 10 is lowered, then the float 26 will also be lowered. It will readily be seen that in order to pull the tape 25 through the pipe 16 and over the rollers 15, a similar power must be applied to the lower end of the tape, said power being derived from the float 26. In other words, before the float 26 will move downwardly, the liquid level must move downwardly relative to the float to leave the top surface of the float extending above the liquid a greater distance than it normally assumes when the liquid is stationary. In other words, as the liquid is being lowered, a less displacement must be imparted by the float in order to increase its weight sufficiently to operate the tape 25 and elevate the weight 33.

The change in elevation of the liquid relative to the float affects the accuracy of the reading of the tape 25 through the opening 35. For that reason it is very desirable that the vertical displacement of the float be reduced to a minimum. This is accomplished by establishing a substantially balanced condition between the weight 33 and the float 26, regardless of the elevated position of said float within the tank; and by providing a float of comparatively large horizontal cross section. It will readily be seen that the larger the float is in horizontal cross section, a smaller variation in the vertical displacement will result. For this reason I have provided a float of cylindrical formation and comparatively long, and at the same time adapted to be placed through a comparatively small opening, usually about three inches in diameter.

Thus it will be seen that I have provided a liquid gauge of simple, durable and inexpensive construction, which may be easily and quickly applied to tanks or containers buried in the ground, and which may be easily read from a station located above and a considerable distance from said tank, and in which the accuracy of the reading of the tank is greatly increased.

I claim as my invention:

1. A liquid gauge comprising a casing, a horizontal shaft rotatively mounted therein, a drum supported on said shaft, a graduated tape wound spirally on the periphery of said drum with its free end projecting downwardly into a tank, a float connected to the lower end of said tape, a second drum on said shaft provided with a frusto-conical shaped working surface, a cable wound on said second drum in the opposite direction from which the tape is wound on the first drum, said cable being wound on the second drum to approach its smaller diameter as the first drum is unwound, and vice versa, and a weight on the free end of said cable.

2. A liquid gauge comprising a casing, a horizontal shaft rotatively mounted therein, a drum supported on said shaft, a graduated tape wound spirally on the periphery of said drum with its free end projecting downwardly into a tank, a float connected to the lower end of said tape, a second drum on said shaft, the active area of which is of frusto-conical formation, a cable wound on said second drum in the opposite direction from which the cable is wound on the first drum to approach its smaller diameter as the first drum is unwound, and vice versa, a hollow container supported on the free end of said cable, and ballast within said container.

Des Moines, Iowa, June 22, 1928.

WALTER R. LAWSON.